(12) United States Patent
Koenig et al.

(10) Patent No.: US 10,600,131 B1
(45) Date of Patent: Mar. 24, 2020

(54) SYSTEM AND METHOD FOR PROVIDING SMART PLANT INCUBATION

(71) Applicant: Sprouts 'R' Us, LLC, Huntington Station, NY (US)

(72) Inventors: Eric Koenig, Huntington, NY (US); Don DiLillo, Huntington Station, NY (US)

(73) Assignee: Sprouts 'R' Us, LLC, Huntington Station, NY (US)

( * ) Notice: Subject to any disclaimer, the term of this patent is extended or adjusted under 35 U.S.C. 154(b) by 0 days.

(21) Appl. No.: 16/408,105

(22) Filed: May 9, 2019

(51) Int. Cl.
| | | |
|---|---|---|
| *G06Q 50/02* | (2012.01) | |
| *A01G 7/00* | (2006.01) | |
| *G06T 19/00* | (2011.01) | |
| *A01G 9/029* | (2018.01) | |
| *A01C 21/00* | (2006.01) | |
| *A01G 25/16* | (2006.01) | |

(52) U.S. Cl.
CPC .............. *G06Q 50/02* (2013.01); *A01G 7/00* (2013.01); *A01G 9/029* (2018.02); *G06T 19/006* (2013.01); *A01C 21/005* (2013.01); *A01G 25/16* (2013.01)

(58) Field of Classification Search
CPC .................................. G06Q 50/02; A01G 9/029
See application file for complete search history.

(56) References Cited

U.S. PATENT DOCUMENTS

| | | | | |
|---|---|---|---|---|
| 7,162,438 B1* | 1/2007 | Kelly | ............... | G06Q 10/06315 705/7.25 |
| 2011/0047042 A1* | 2/2011 | Blickhan | ................ | G06Q 10/06 705/26.25 |
| 2011/0162271 A1* | 7/2011 | Schuler | ................ | A01G 9/0293 47/65.7 |
| 2013/0060473 A1* | 3/2013 | Tomida | ................ | A01G 25/167 702/3 |
| 2014/0337764 A1* | 11/2014 | Caraballoso | ........ | G06F 17/5004 715/753 |
| 2018/0000025 A1* | 1/2018 | He | ........................ | A01G 25/167 |
| 2018/0224802 A1* | 8/2018 | Vasavada | ............. | G03H 1/0005 |

(Continued)

OTHER PUBLICATIONS

Lan-Da Van et al., "PlantTalk: A Smartphone-Based Intelligent Hydroponic Plant Box", Sensors 2019, 19, 1763, pp. 1-13 (Year: 2019).*

(Continued)

*Primary Examiner* — Nay A Maung
*Assistant Examiner* — Jose Torres
(74) *Attorney, Agent, or Firm* — Georgiy L. Khayet (57) ABSTRACT

Disclosed is a system for providing plant incubation. An example system may include, a jar having a top opening and a bottom opening, seal lids configured to be removably secured at the top opening or the bottom opening, perforated lids configured to be removably secured at the top opening or the bottom opening, a stand for supporting the jar vertically, and a user computing device. The user computing device is configured to receive data associated with the jar and data associated with the seeds, determine, based on the data, reminders concerning seed planting and times for the reminders, and provide the reminders at the times for the reminders. The reminders including instructions to perform actions with the jar, seal lids, perforated lids, stand, and seeds. The system may further include a smart unit associated with the jar to provide data concerning physical conditions in the jar.

25 Claims, 6 Drawing Sheets

(56) References Cited

U.S. PATENT DOCUMENTS

2019/0082619 A1* 3/2019 Martin .................. A01G 31/047
2019/0208711 A1* 7/2019 Sahu ...................... A01G 7/045

OTHER PUBLICATIONS

Namgyel et al., "IoT based hydroponic system with supplementary LED light for smart home farming of lettuce", 2018 15th International Conference on Electrical Engineering/Electronics, Computer, Telecommunications and Information Technology, 2018 IEEE, pp. 221-224 (Year: 2018).*

Katagiri et al., "Design and Construction of an Inexpensive Homemade Plant Growth Chamber", PLoS One 10(5): e0126826, May 12, 2015, pp. 1-14 (Year: 2015).*

* cited by examiner

SYSTEM AND METHOD FOR PROVIDING SMART PLANT INCUBATION

This application is related to U.S. application Ser. No. 16/407,971 titled "System and Method for Providing Sprout Incubation, Air Flow, Hydration, and Drainage", filed on May 9, 2019. The subject matter of the aforementioned application is incorporated herein in its entirety for all purposes.

TECHNICAL FIELD

This disclosure generally relates to the field of planting and sprouting seeds and, more particularly, to systems and methods for providing plant incubation.

BACKGROUND

Plants (including sprouts) are widely used as a source of nutrition and microelements helping digestion. Sprouts, for example, can be grown in jars. However, incubation of plants and sprouting of seeds in jars requires a proper level of moisture, light, air flow, and amount of oxygen to be provided to the seeds to cause growth of the sprouts and plants and reduce chances of bacteria growth and mold. Incubating of plants and sprouting of seeds also requires various actions with respect to seeds and the jar to be taken at appropriate times depending on amount of seeds and variety of the seeds.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

This disclosure is directed to seeds sprouting. Embodiments of the present disclosure provide methods and systems for providing plant incubation, air flow, hydration, and drainage. Embodiments of the present disclosure provide an application for facilitating seeds planting and sprouting.

According to one example embodiment, a system for providing plant incubation is disclosed. The system may include a jar having a top opening and a bottom opening, seal lids configured to be removably secured at the top opening or the bottom opening, perforated lids configured to be removably secured at the top opening or the bottom opening, a stand for supporting the jar vertically, and a user computing device. The user computing device can be configured to receive data associated with the jar and data associated with the seeds. The user computing device can generate, based on the data, reminders concerning seed planting and times for the reminders. The reminders may include instructions to perform actions with the jar, seal lids, perforated lids, stand, and seeds. The user computing device can provide the reminders to the user at specific times.

The data associated with the jar may include a smart unit associated with the jar. The smart unit may include at least one sensor configured to provide sensor data concerning physical conditions associated with the jar. The smart unit may include a logic controller configured to convert the sensor data into digital data. The smart unit may include a wireless communication unit configured to transmit the digital data to the user computing device. The user computing device can provide, based on the digital data, an alert or message concerning the physical conditions of the jar. The wireless communication unit may include one of: a Bluetooth™ unit and a near field communication unit. The sensor may include a temperature sensor and a water level sensor.

The data associated with the seeds may include a species of the seeds and a quantity of the seeds. The system may further include a seed packet. The seed packet may include an image with a coded information concerning the seeds. The user computing device can receive the data associated with seeds by scanning the image.

The system may further include a unique identifier of the jar. The user computing device can associate the reminders and time for the reminders with unique identifiers. The jar may include a radio frequency identification (RFID) chip. The user computing device can read the unique identifier from the RFID chip.

The user computing device can be configured to provide, based on the data associated with the seeds, instructions concerning planting of the seeds. The instructions can be presented by one or more of text messages, animations, videos, and an augmented reality content.

The user computing device can determine, based on the data associated with the seeds, an expected time for the plants to be grown and an expected volume of the plants within the jar. The user computing device may display an image of the jar and the expected volume of the plants within the jar.

The reminders may include an instruction to secure one of the seal lids at the bottom opening of the jar. The reminders may further include an instruction to fill the jar with the seeds and an amount of water. The amount of water can be determined based on the data associated with the jar and the data associated with the seeds.

The reminders may further include an instruction to soak the seeds for a first period of time. The first period of the time can be determined based on the data associated with the seeds. The reminders may further include an instruction to secure one of the perforated lids at top opening of the jar and invert the jar by the top opening down after the period of time has been expired.

The reminders may further include an instruction to replace the seal lid at the bottom opening of the jar with one of the perforated lids to allow air flow through the jar. The reminders may further include an instruction to invert the jar and rinse the jar and the seeds with water after a second period of time. The second period of time can be determined based on the data associated with the seeds.

The user computing device includes one of: a smartphone, tablet, desktop, laptop, or smart TV.

According to another example embodiment a method for providing plant incubation is disclosed. The method may include receiving, by a user computing device, data associated with a jar and data associated with seeds. The method may further include generating, by the user computing device and based on the data associated with the jar and the data associated with seeds, reminders concerning planting the seeds and times for the reminders. The reminders may include instructions to perform actions with the jar and the seeds. The method may include providing, by the user computing device, the reminders to a user at the times for the reminders.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Embodiments of this disclosure generally relate to seed planting. A system for plant incubation is provided. In an example embodiment, the system may be used for sprout incubation. An example system may include a jar having a top opening and a bottom opening, seal lids configured to be removably secured at the top opening or the bottom opening, perforated lids configured to be removably secured at the top opening or the bottom opening, and a stand for supporting the jar vertically. The system may further include a smart unit associated with the jar. The smart unit may include at least one sensor configured to provide sensor data concerning physical conditions associated with the jar. The smart unit may include a logic controller configured to convert the sensor data in a digital data. The smart unit may include a wireless communication unit configured to transmit the digital data to a user computing device.

The user computing device can be configured to receive an information including data associated with jar, data associated with seeds, and the digital data. The user computing device can generate, based on the information, reminders concerning planting the seeds and times for the reminders. The reminders may include instructions to perform actions with the jar, the seal lids, the perforated lids, the stand and the seeds. The user computing device can provide the reminders to user at specific times. The user computing device can provide, based on the digital data, a prompt or message concerning the physical condition of the jar.

Figure 1:
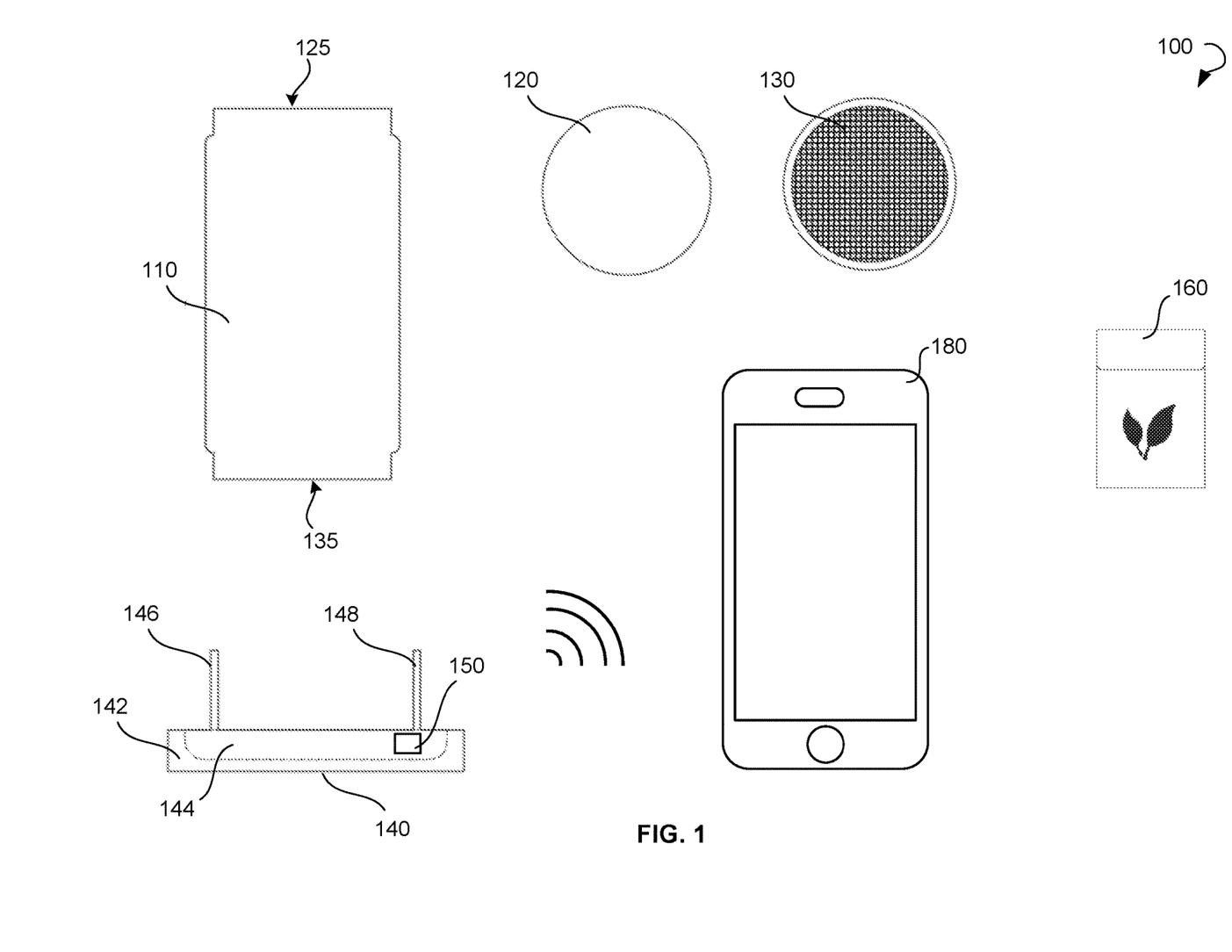
FIG. 1 is a block diagram showing a system for providing plant incubation, according to an example embodiment.

Referring now to the drawings, FIG. 1 is a block diagram showing an example system 100 for plant incubation, according to an example embodiment. The system 100 may include a jar 110, one or more seal lids 120, one or more perforated lids 130, a stand 140 for the jar 110, a user computing device 180, and a seed packet 160. The jar 110 may include a top opening 125 and a bottom opening 135. The jar 110 can be made of glass or any other suitable material that allows for plant growth.

The seal lids 120 and the perforated lids 130 can be removably secured at the top opening 125 or the bottom opening 135. In various embodiments, the seal lids 120 and the perforated lids 130 can be secured to the top opening 125 or the bottom opening 135 by snap, screw, twist, suction, magnet, or other securing mechanism. In some embodiments, the seal lid 120 can be replaced with an insert holder and a seal insert to be placed within the insert holder. In certain embodiments, the perforated lid 130 can be replaced with an insert holder and a perforated insert to be placed within the insert holder. The insert holder can be removably attachable to the top opening of the jar 110 or the bottom opening of the jar 110 by using one of snap, screw, twist, suction, magnet, or other securing mechanism.

The stand 140 may include a base 142, support legs 146 and 148, and a tray 144 for collecting liquid. In various embodiments, the stand 140 can be secured to an end of the jar 110 with either the seal lid 120 or the perforated lid 130 being secured to the end of the jar 110. The stand 140 can be secured to the seal lid 120 or the perforated lid 130 by one of screw, twist, suction, magnet, or other securing mechanism. In some embodiments, the stand 140 can be integrated with either the perforated lid 140 or the seal lid 130 into a single unit. In various embodiments, the stand 140 can be of different sizes and geometrical shapes (circle, square, triangular, hexagon, involute gear, and so forth) to allow for better support of the jar 110. The stand 140 may be wider at bottom than the jar 110 to provide a sturdy foundation.

The seed packet 160 may contain seeds. A quantity of the seeds can be calibrated based on the size and volume of the jar 110 and species of the seeds. The quantity of the seeds can be also calibrated based on an estimated amount an airflow through the opening of the jar 110.

The system 100 may further include a smart unit 150. The smart unit 150 can be integrated into the stand 140. In other embodiments, the smart unit 150 may be integrated into the jar 110. In certain embodiments, the smart unit 150 may be integrated into an integrated unit that also comprises the stand 140 and one of the seal lid 130 or the perforated lid 140. The smart unit 150 can be configured to wirelessly communicate with the user computing device 180.

The user computing device 180 may include, but not limited to, a smart phone, a tablet computer, a desktop computer, a smart television set, a smart home device, and so forth. The user computing device 180 can receive a user input including data concerning the jar 110 and data concerning the seeds in the seed packet 160. In some embodiments, the user computing device 180 can be configured to scan a barcode, a quick response (QR) code, or another image and determine the data concerning the jar 110 and the data concerning the seeds in the seed packet 160. The barcode, the QR code, or another image can be placed on the seed packet 160, on a surface of the jar 110, or a surface of the stand 140. In certain embodiments, the user computing device 180 can be configured to receive data concerning the jar 110 and physical conditions within the jar 110 from the smart unit 150.

The user computing device 180 can be configured to provide reminders, prompts, alerts, and instructions during seeds planting and sprouting. The user computing device 180 can be configured to provide information regarding the species of the seeds and expected size of the plants and/or sprouts. The information can be presented in both a text form and a graphical representation.

Figure 2:
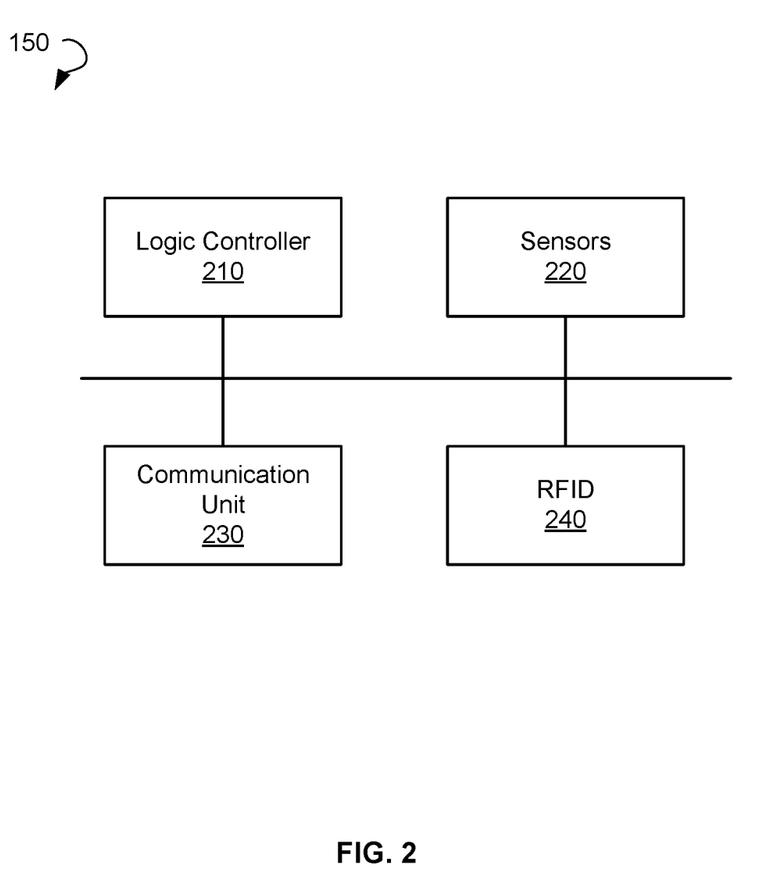
FIG. 2 is a block diagram showing a smart unit associated with a jar for plant incubation, according to an example embodiment.

FIG. 2 is a block diagram showing an example smart unit 150, according to some example embodiments. The smart unit 150 may include a logic controller 210, one or more sensors 220, a communication unit 230. In some embodiments, the smart unit 150 can also include a radio-frequency identification (RFID) chip.

The logic controller 210 may include a digital signal processor, a microprocessor, an application specific integrated circuit, a programmable logic device, a field programmable gate array, or similar type of processing chips. The logic controller 210 can receive data from the sensors 220, convert the data into a digital form and transmit the data in the digital form to the user computing device 180 via the communication unit 230.

In various embodiments, the communication unit 230 can be configured to support data transfer over a wireless network. The communication unit 230 may include one of Wi-Fi, Bluetooth™, Worldwide Interoperability for Microwave Access (WiMAX), infrared, near field communication (NFC), and other communication interfaces. In addition, the smart unit 150 may communicate with the user computing device via any suitable communication technology, for example, WiFi communication, cellular communication, and so forth. In view of this, the system 100 having the smart unit 150 may act as an Internet of Things (TOT) device.

In various embodiments, the sensors 220 may include one or more of: a thermometer, a humidity sensor, a water level sensor, a gyroscope, a barometric pressure sensor, a lighting sensor, a weather sensor, and other sensor that may provide data regarding physical conditions within the jar 110 and position of the jar 110. For example, the sensors 220 may provide data regarding a temperature within the jar 110, a humidity level within the jar 110, an angle at which the jar 110 is inclined, and a water level within the jar 110. The sensor 220 may also provide data regarding position of the jar 100. The positions may include: "the jar is positioned by top opening up", "the jar is position by bottom opening up", "the jar lays on a side", and so forth. In some embodiments, the logic controller can be configured to provide, based on the data from sensors, alerts to the user computing device. For example, the alerts may include warnings, for example: "a water level is too low", "a temperature is too high", "the sprouts are ready to be removed from the jar", and so forth. Furthermore, the sensors may also detect atmospheric conditions or access local or regional weather data, e.g., from the weather channels or websites, via an application programming interface. Based on the detected or collected information, the sensors may provide recommendations related to the conditions in the room or outside area where the jar is located, as well as for the surrounding area (i.e., a city/town), such as a temperature, humidity, barometric pressure, precipitation, lighting, air quality, and so forth.

The RFID chip 240 may provide a unique identifier of the jar 110. The user computing device 180 can be configured to receive the unique identifier by reading the information from the RFID chip 240. Based on the unique identifier, the user computing device 180 can be configured to determine a type of the jar and a volume of the jar. The user computing device 180 can be configured to provide information specific to the jar 110 and seeds currently sprouting in the jar 110.

In other embodiments, the smart unit 150 may include additional or other components necessary for operations of the smart unit 150. Similarly, in certain embodiments, the smart unit 150 may include fewer components that perform functions similar or equivalent to those depicted in FIG. 2.

In an example embodiment, the smart unit 150 may be integrated into any type of jars or systems for providing plant incubation, such as conventional jars, sprouting bags, tiered sprouters, double open-ended jars with seal lids and perforated lids, and so forth. In other words, the smart unit 150 may be applied in any planting system so that the data can be transmitted from a smart stand or a smart base of the planting system to a user computing device.

Figure 3:
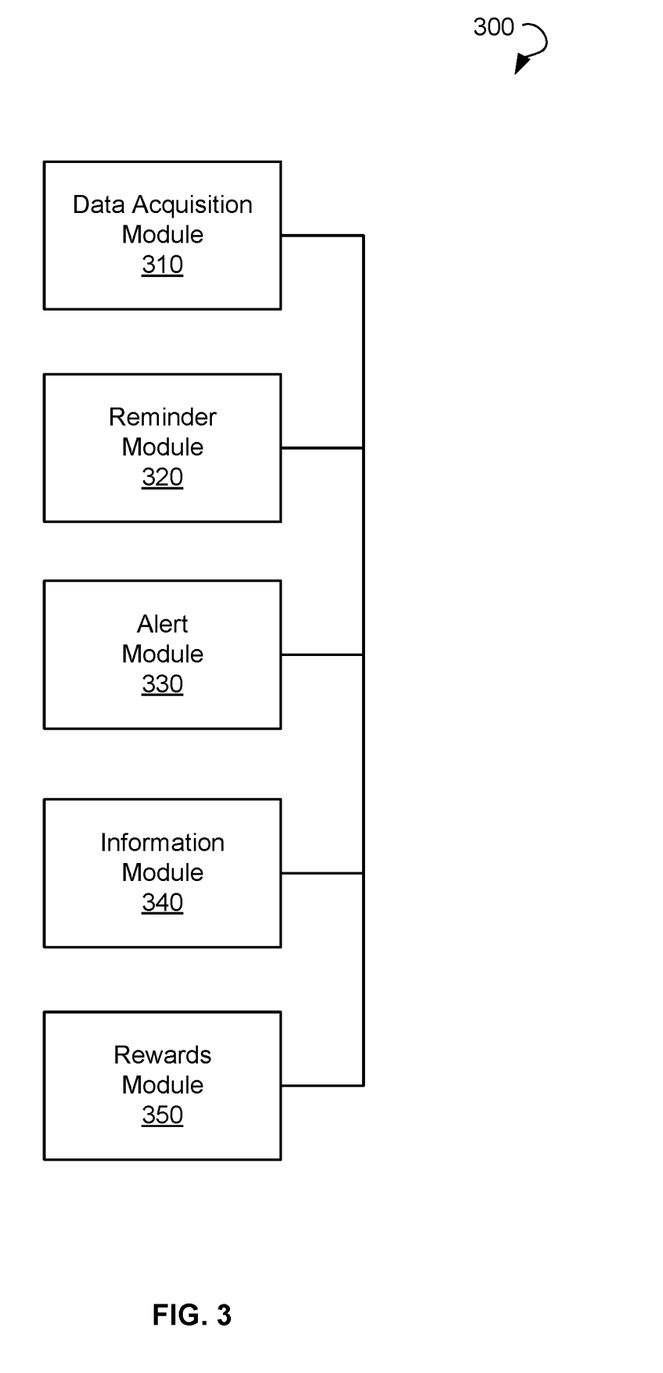
FIG. 3 is a block diagram showing an example application for plant incubation, according to an example embodiment.

FIG. 3 is a block diagram showing an application 300 for seeds planting, according to some example embodiments. The application 300 can be stored in memory of the user computing device as instructions executable by one or more processors of the user computing device 180. The application 300 may include a data acquisition module 310, a reminder module 320, an alert module 330, an information module 340, and a rewards module 350. It should be noted, that in other embodiments the application 300 may include additional modules or fewer modules that perform functions of the modules shown in FIG. 3.

In some embodiments the data acquisition module 310 may collect information regarding a user, jar, and seeds. Upon downloading the application 300, the user may create a user profile. The user may enter data concerning the jar 110 (for example, a unique identifier of the jar 110), and species and amount of seeds. The data acquisition module 310 can be configured to receive the data regarding the data concerning the jar 110 by scanning a bar code or QR code on the jar 110 or stand 140 for the jar. The data acquisition module 310 can be configured to receive the unique identifier from an RFID chip 240. The data acquisition module 310 can be configured to receive data concerning species and quantity of the seeds by scanning a bar code, a QR code, or another image on the seed packet 160. The data acquisition module can be configured to receive data from the sensors 230 of the smart unit 150.

In some embodiments, the reminder module 320 may generate, based on data concerning the species and quantity of the seeds, reminders for the user to perform specific tasks and actions with the jar and the seeds at specific times. The reminder module 320 may enter the reminder to a calendar application integrated in the user computing device 180. The reminder may be delivered via any type of character, for example, an animated sprout character. The animated sprout character can be customized by the user.

In some embodiments, the alert module 330 may provide, based on data from the sensors 230 of the smart unit 150, alerts concerning current physical conditions within the jar 110. For example, the alerts may include warnings, for example: "a water level is too low", "a temperature is too high", "the jar got fallen on aside", "the sprouts are ready to be removed from the jar", and so forth.

In some embodiments, the information module 340, may provide, based on the species and quantity of seeds, an informative content to the user. The informative content can be time-sensitive. The informative content can be displayed based on the time of day or a specific alert or a reminder the user has received. The informative content may be delivered in the form of infographics, animations, videos, augmented reality (AR) content, and so forth.

In some embodiments, the AR content can be generated by a triggering event. Displaying of the AR content can be triggered after a camera of the user computing device 180 captures a pre-determined image, for example an image of the jar 110. In other embodiments, the AR content can be displayed without detecting any triggering event at any time the user opens the application 300 on the user computing device 180 or an Interment browser at website to view the AR content. The AR content can be generated by a beacon or other wireless communication signal from the jar 110 or the stand 140 for the jar 140.

In some embodiments, the user may be required to "plate" or "ground" the AR content, that is to locate a flat surface on which the AR content can be placed. In other embodiments, the user may not be required to "plate" or "ground" the AR content, so that the AR content can "float" or move freely in a space.

The AR content may include AR image filters and overlays. The user may use the AR content to customize the sprouts and assign them "personality" and anthropomorphic characteristics.

The AR content may include a virtual label to inform which species of the seeds are in the jar. The AR content may also include information such as, but not limited to, when the next rinse cycle for sprouts is, how long the sprouts have been in the jar, expected time left for the sprouts to be ready, expected time left for the plants to be grown, temperature and humidity within the jar, and so forth.

The information module 340 may allow the user to identify plants or sprouts in a jar via a visual search. For example, user can point the user computing device's camera at the plants or sprouts. The information module 340 may further identify the species of the plants or sprouts using an image recognition. The information module 340 may further access a database to provide information about the identified plants or sprouts.

In some embodiments, the rewards module 350 can track interactions of the user with the jar, tasks completed by the user, and compliance of actions made by user with any recommended requirements for plant incubation. The tasks may include planting or sprouting a certain species of seeds, sprouting five different species of seeds, sprouting seeds for a one month, sprouting seeds for two months, and so forth. In response to completing tasks, the rewards module 350 may assign "badges" or rewards to the user. The badges may be monetized or otherwise redeemable in the form of in-app currency to be used for sprouting products, such as additional kits for sprouting and seed packets.

The application 300 may further aggregate and store user input and data including completed tasks. The application 300 may generate, based on the user input and data, personalized and profiled offers to the user for additional sprouting products. The offers can be generated based on a machine learning technique and adaptive algorithms. The application 300 may provide the data to third parties, for example, sponsors, brands, marketers, and so forth. Specifically, collected data associated with the user and interactions of the user with the jar may be analyzed using machine learning and AI techniques. Based on the analysis, the application 300 may generate planting or sprouting recommendations for the user. Furthermore, the application 300 may use the results of the analysis to select sponsored offers for the user, such as additional parts associated with the jar, replacement parts associated with the jar, additional seed packets for use with the jar, and so forth. Furthermore, the third-parties may use the data associated with the user and results of the analysis to select products for advertising to the user. The products, such as additional parts, replacement parts, seed packets, may be provided to the user as sponsored offers through a graphical user interface associated with the user computing device.

In an example embodiment, the rewards module 350 can reward users for acknowledging receipt of and interacting with any and all informative content, for example, an informative 'how-to' notification for a user on when to water a plant, which may be either delivered by the application 300 or shared through social media.

Furthermore, a social community may be created for users in which the users may share updates about the status of plants or sprouts of the users and tips for planting and sprouting with each other through in-application sharing or commenting. In addition, the user can earn rewards for sharing content via social media or through email or text and activity in the social community. The users may also keep track of each other's "compliance rewards" by way of a leaderboard that may display the highest-ranking users.

In further example embodiments, a commerce portal and sponsored offers may be provided to users. The users may purchase additional seed packets, additional and/or replacement parts associated with a system for providing plant incubation through the application 300 running on the user computing device, or a website accessed via the user computing device. As the user continues to purchase products through the application 300, historical data associated with the user may be used by the adaptive logic of the artificial intelligence (AI). In particular, the AI may be used to predict when the user may need additional materials and proactively suggest a product order to the user, or enroll the user in an ongoing continuity program in which the user is billed automatically (e.g., every month) and shipped the parts the user needs. Users can also purchase products from third-party marketers directly through the application 300 running on the user computing device, or a website accessed via the user computing device. These third-party marketers can advertise products and services to any user, based on of the data learned by the AI as the users continue to update the status of the plants and/or sprouts, compliance of the user with any recommended requirements, and any data contained in a user profile created upon downloading the application 300 or first use of the application 300.

In addition, data mining and analytics may be applied. Specifically, as each user registers and creates a user profile, data associated with the users may be gathered. As the user continues to engage with the application 300, any interaction may result in updating data of the user profile by the machine learning and AI to reflect any new or learned information. This information can then be used to provide analysis and insight reports on each user or specific user groups (i.e., demographics), as well as this data may be used to make planting or sprouting recommendations to the user, further users, or user groups, or may be available to third-party marketers and sponsors.

In an example embodiment, an educational content portal may be created for the users to provide the users with access to industry news and current events, as well as sprouting-specific content and planting-specific content, e.g., via an updated news feed. Premium exclusive content may be provided to users for an additional fee.

Figure 4:
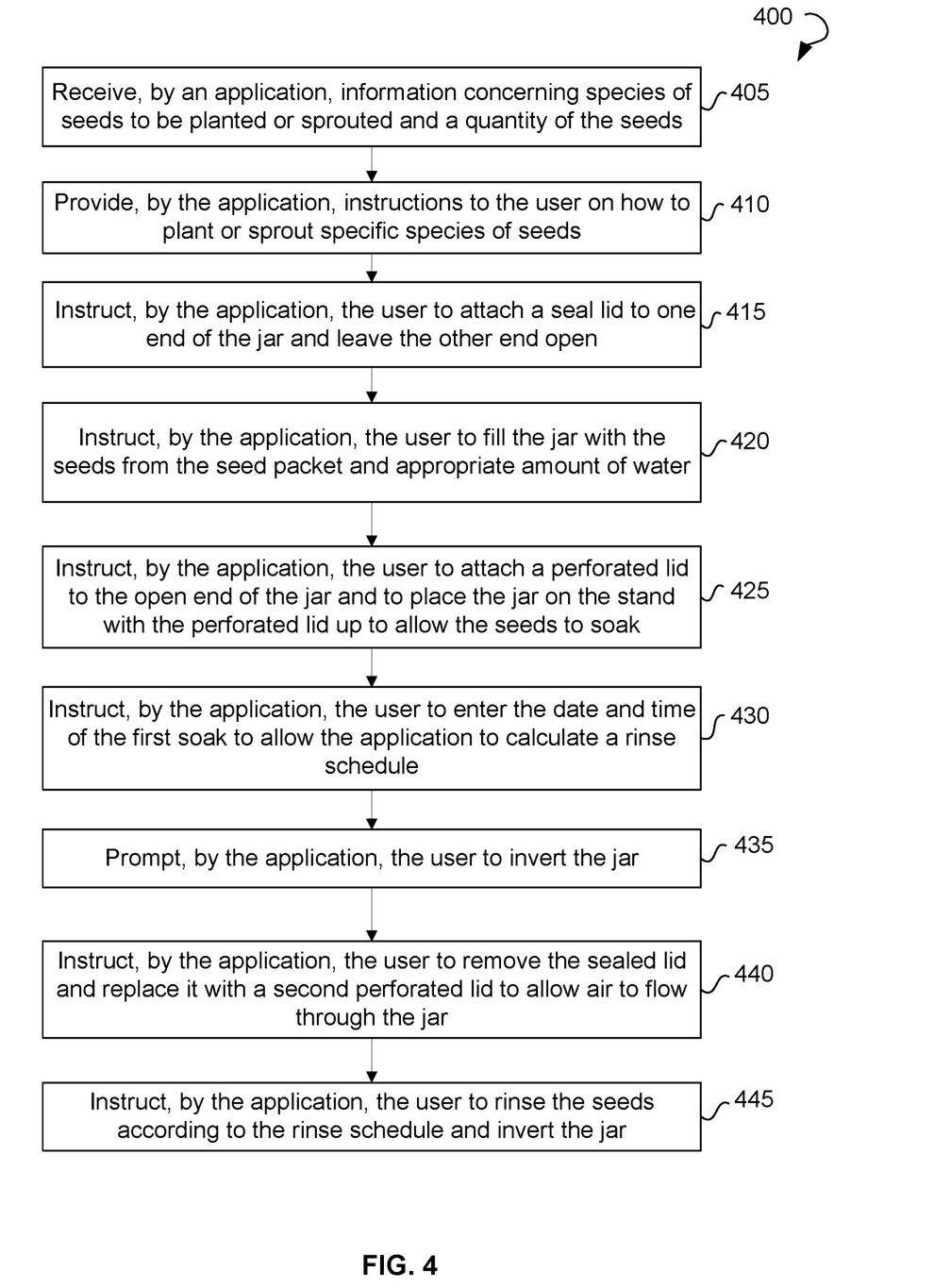
FIG. 4 is a flow chart showing a method for seed planting using an application for seed incubation, according to some example embodiments.

FIG. 4 is flow chart showing a method 400 for seed spouting, according to an example embodiment. The method 400 can be performed using a kit for planting and sprouting and an application 300 for seed planting and sprouting on the user computing device 180. The kit for planting and sprouting may include the jar 110, seal lids 120, perforated lids 130, a stand 140, and a seed packet 180. The user may download the application 300 on the user computing device and register by creating a user profile in the application.

The method 400 may commence in block 405 with receiving, by the application, information concerning species of seeds to be planted or sprouted and a quantity of the seeds. The data can be entered by the user manually or scanned from a code on the seed packet.

In block 410, the application 300 may provide instructions to the user on how to plant or sprout the specific species of seeds. For example, the application may display a time to soak the seeds, how often to rinse the seeds, and so forth. The instructions can be provided via in-app infographics, animations, videos, AR content, and so forth.

In block 415, the application 300 may instruct the user to attach a seal lid to one end of the jar and leave another end open.

In block 420, the application 300 may instruct the user to fill the jar with the seeds from the seed packet and appropriate amount of water.

In block 425, the application 300 may instruct the user to attach a perforated lid to the open end of the jar and to place the jar on the stand with the perforated end up and sealed end down to allow the seeds to soak.

In block 430, the application 300 may instruct the user to enter the date and time of the first soak to allow the application 300 to determine appropriate rinse schedule for the optimal planting or sprouting.

In block 435, the application 300 may prompt the user to invert the jar. Upon receiving the prompt, the user inverts the jar with the perforated end down, allowing the jar to drain.

In block 440, the application 300 may instruct the user to remove the sealed lid (which is now on top) and replaced it with a second perforated lid to allow air to flow through the jar.

In block 445, the application 300 may instruct the user to rinse the seeds according to the rinse schedule and invert the jar. The blocks 445 can be repeated per instructions by the application 300 until plants or sprouts are ready to be harvested.

The seeds, plants, or sprouts may need to be rinsed by running water through the top perforated insert and into the jar and then allowing the water to drain out the bottom perforated insert. The jar can be shaken over the sink to remove excess water before attaching the jar back onto the stand to continue to drain into the tray integrated in the stand.

Figure 5:
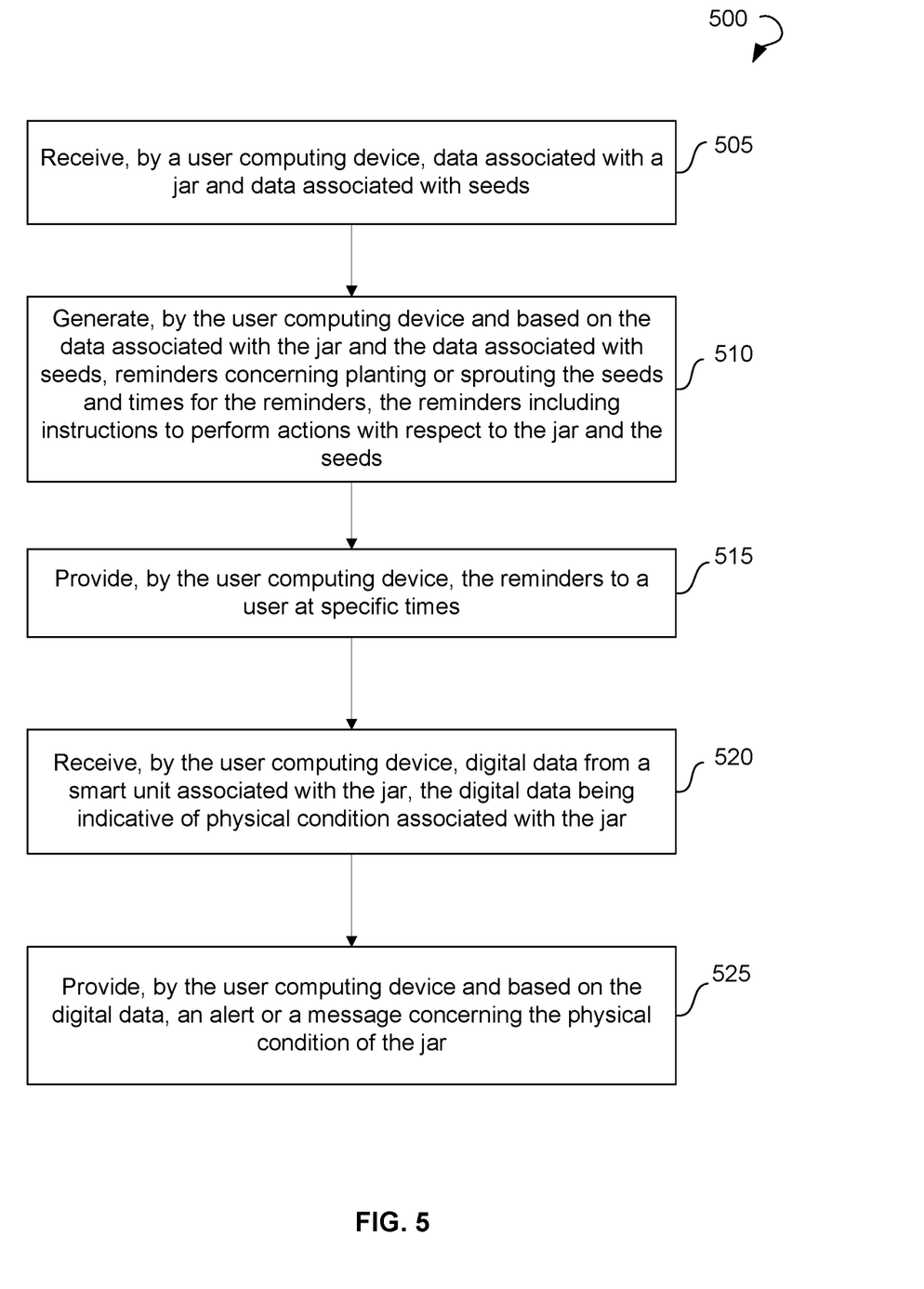
FIG. 5 is a flow chart showing a method for providing plant incubation, according to some example embodiments.

FIG. 5 is a flow chart showing a method 500 for providing plant incubation, according to some example embodiments. The method 500 can be implemented by the user computing device 180 shown in FIG. 1.

The method 500 may commence in block 505 with receiving, by a user computing device, data associated with a jar and data associated with seeds.

In block 510, the method 500 may include generating, by the user computing device and based on the data associated with the jar and the data associated with seeds, reminders concerning planting or sprouting the seeds and times for the reminders. The reminders may include instructions to perform actions with the jar and the seeds. The data associated with the seeds may include species of the seeds and a quantity of the seeds.

The jar may have a top opening and a bottom opening. The reminders may include an instruction to secure a seal lid at the bottom opening of the jar. The reminders may further include an instruction to fill the jar with the seeds and an amount of water. The amount of water can be determined based on the data associated with the jar and the data associated with the seeds. The reminders may further include an instruction to soak the seeds for a first period of time. The first period of the time can be determined based on the data associated with the seeds. The reminders may further include an instruction to secure a perforated lid at the top opening of the jar and invert the jar by the top opening down after the period of time has been expired. The reminders may further include an instruction to replace the seal lid at the bottom opening of the jar with a further perforated lid to allow air flow through the jar. The reminders may include an instruction to invert the jar and rinse the jar and the seeds with water after a second period of time. The second period of time can be determined based on the data associated with the seeds.

In block 515, the method 500 may include providing, by the user computing device, the reminders to a user at the times for the reminders.

In block 520, the method 500 may include receiving, by the user computing device, digital data from a smart unit associated with the jar or stand for the jar, the digital data being indicative of physical condition associated with the jar.

In block 525, the method 500 may include providing, by the user computing device and based on the digital data, an alert or a message concerning the physical conditions of the jar.

In an example embodiment, a plurality of systems for providing plant incubation may be applied in multi-unit smart farms. Specifically, a user may connect multiple stands with jars together to create a farm set-up. The user computing device may notify the user with the information relating to each individual jar, seed unit, or plant grown in the jar.

Figure 6:
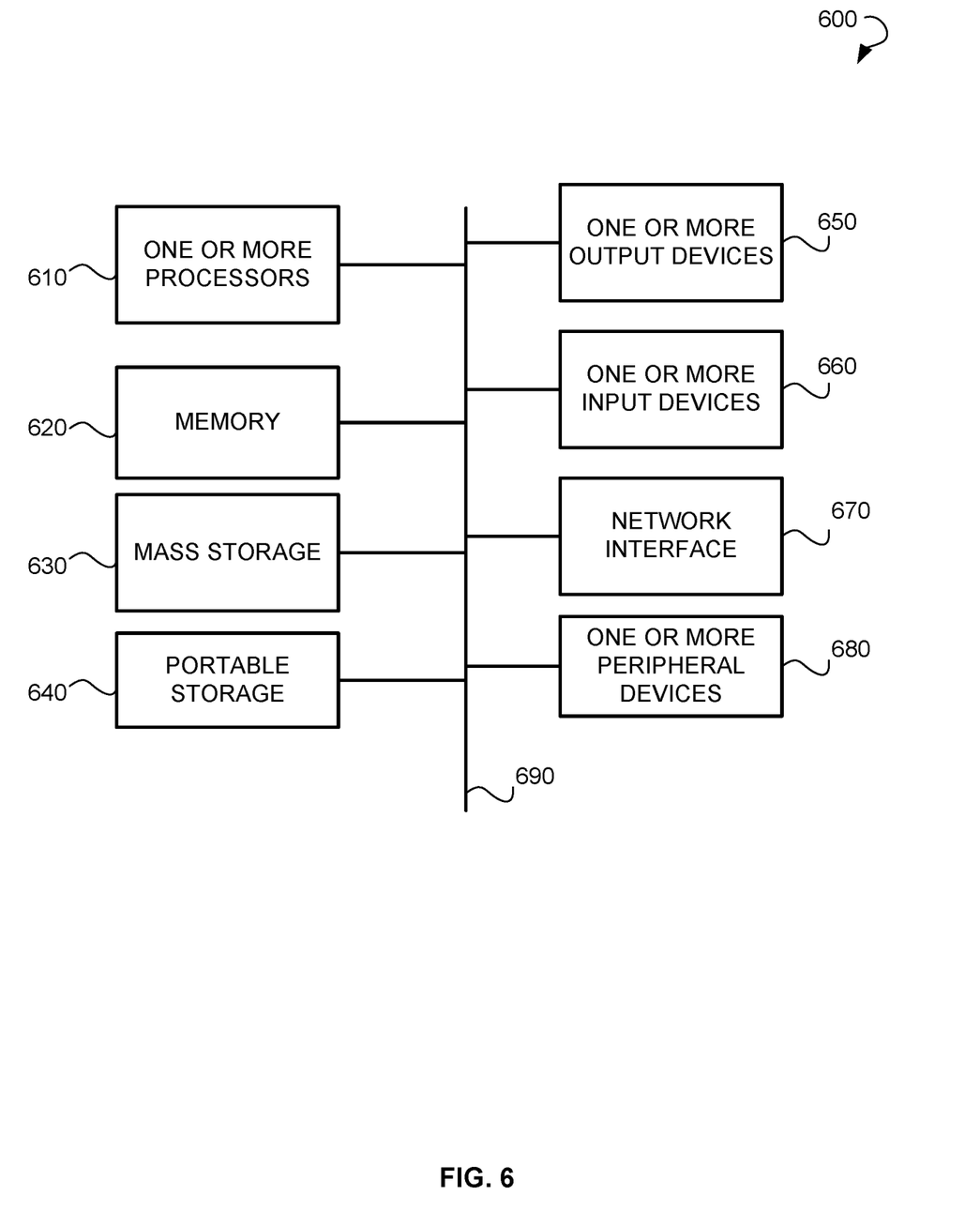
FIG. 6 shows a diagrammatic representation of a computing device for a machine, within which a set of instructions for causing the machine to perform any one or more of the methodologies discussed herein, can be executed.

FIG. 6 illustrates an exemplary computing system 600 that may be used to implement embodiments described herein. The computing system 600 may provide details for the user computing device 180 shown in FIG. 1. The exemplary computing system 600 of FIG. 6 may include one or more processors 610 and memory 620. Memory 620 may store, in part, instructions and data for execution by the one or more processors 610. Memory 620 can store the executable code when the exemplary computing system 600 is in operation. The exemplary computing system 600 of FIG. 6 may further include a mass storage 630, portable storage 640, one or more output devices 650, one or more input devices 660, a network interface 670, and one or more peripheral devices 680.

The components shown in FIG. 6 are depicted as being connected via a single bus 690. The components may be connected through one or more data transport means. The one or more processors 610 and memory 620 may be connected via a local microprocessor bus, and the mass storage 630, one or more peripheral devices 680, portable storage 640, and network interface 670 may be connected via one or more input/output buses.

Mass storage 630, which may be implemented with a magnetic disk drive or an optical disk drive, is a non-volatile storage device for storing data and instructions for use by a magnetic disk or an optical disk drive, which in turn may be used by one or more processors 610. Mass storage 630 can store the system software for implementing embodiments described herein for purposes of loading that software into memory 620.

Portable storage 640 may operate in conjunction with a portable non-volatile storage medium, such as a compact disk (CD) or digital video disc (DVD), to input and output data and code to and from the computing system 600 of FIG. 6. The system software for implementing embodiments described herein may be stored on such a portable medium and input to the computing system 600 via the portable storage 640.

One or more input devices 660 provide a portion of a user interface. The one or more input devices 660 may include an alphanumeric keypad, such as a keyboard, for inputting alphanumeric and other information, or a pointing device, such as a mouse, a trackball, a stylus, or cursor direction keys. Additionally, the computing system 600 as shown in FIG. 6 includes one or more output devices 650. Suitable one or more output devices 650 include speakers, printers, network interfaces, and monitors.

Network interface 670 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 670 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 680 may include any type of computer support device to add additional functionality to the computing system. The one or more peripheral devices 680 may include a modem or a router.

The components contained in the exemplary computing system 600 of FIG. 6 are those typically found in computing systems that may be suitable for use with embodiments described herein and are intended to represent a broad category of such computer components that are well known in the art. Thus, the exemplary computing system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, systems and methods for providing plant incubation are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for providing plant incubation, the system comprising:
   a jar having a top opening and a bottom opening;
   a seal lid configured to be removably secured at the bottom opening;
   a first perforated lid configured to be removably secured at the top opening;
   a second perforated lid configured to be removably secured at the bottom opening in replacement of the seal lid;
   a stand for supporting the jar vertically; and
   a user computing device configured to:
      receive data associated with the jar and data associated with seeds;
      generate, based on the data associated with the jar and the data associated with seeds, reminders concerning seed planting and times for the reminders, the reminders including instructions to perform actions with respect to the jar, the seal lid, the first perforated lid, the second perforated lid, the stand, and the seeds, the actions including at least replacing the seal lid with the second perforated lid at the bottom opening; and
      provide the reminders to a user at the times for the reminders.

2. The system of claim 1, further comprising a smart unit integrated into the jar, the smart unit comprising:
   at least one sensor configured to provide sensor data concerning a physical condition associated with the jar;
   a logic controller configured to convert the sensor data into digital data; and
   a wireless communication unit configured to transmit the digital data to the user computing device; and wherein the user computing device is configured to provide, based on the digital data, an alert or a message concerning the physical condition of the jar.

3. The system of claim 2, wherein the wireless communication unit includes one of: a Bluetooth™ unit, a WiFi unit, a cellular communication unit, an infrared communication unit, and a near field communication unit.

4. The system of claim 2, wherein the smart unit includes an Internet of Things (IoT) device, the IoT device being in communication with the user computing device.

5. The system of claim 2, wherein the at least one sensor includes one or more of the following: a temperature sensor, a barometric pressure sensor, a lighting sensor, a weather sensor, a water level sensor, a humidity sensor, and a gyroscope.

6. The system of claim 1, wherein the data associated with the seeds includes a species of the seeds and a quantity of the seeds.

7. The system of claim 1, wherein the seeds are provided in a seed packet, the seed packet including an image with a coded information concerning the seeds, and wherein the user computing device is configured to receive the data associated with the seeds by scanning the image.

8. The system of claim 1, wherein the data associated with jar includes a unique identifier of the jar, and wherein the user computing device is configured to associate the reminders and the time for the reminders with the unique identifier.

9. The system of claim 8, wherein:
the jar includes a radio frequency identification (RFID) chip; and
the user computing device is configured to read the unique identifier from the RFID chip.

10. The system of claim 1, wherein the user computing device is configured to provide, based on the data associated with the seeds, instructions concerning planting of the seeds, the instructions being presented by one or more of text messages, animations, videos, and an augmented reality content.

11. The system of claim 1, wherein the user computing device is configured to determine, based on the data associated with seeds, an expected time for plants to be grown and an expected volume of the plants within the jar.

12. The system of claim 11, wherein the user computing device is configured to display an image of the jar and the expected volume of the plants within the jar.

13. The system of claim 1, wherein the reminders include:
an instruction to secure the seal lid at the bottom opening of the jar;
an instruction to fill the jar with the seeds and an amount of water, wherein the amount of water being determined based on the data associated with the jar and the data associated with the seeds;
an instruction to soak the seeds for a first period of time, the first period of the time being determined based on the data associated with the seeds;
an instruction to secure the first perforated lids at the top opening of the jar and invert the jar by the top opening down after the first period of time has been expired;
an instruction to replace the seal lid at the bottom opening of the jar with the second perforated lid to allow air flow through the jar; and
an instruction to invert the jar and rinse the jar and the seeds with water after a second period of time, the second period of time being determined based on the data associated with the seeds.

14. The system of claim 1, further comprising at least one further jar and at least one further stand for supporting the further jar vertically, wherein the stand and the further stand are attachable to each other when the stand supports the jar and the further stand supports the further jar, the stand including a smart unit, the further stand including a further smart unit, the smart unit and the further smart unit being configured to communicate with the user computing device.

15. The system of claim 1, wherein the user computing device is configured to:
track interactions of the user with the jar;
track compliance of the interactions with recommended requirements for plant incubation; and
based on at least one of the interactions and the compliance, provide a reward to the user.

16. The system of claim 15, wherein the user computing device is configured to share a status of plants or sprouts of the user in a social community, wherein the reward is further provided to the user for sharing the status, providing content associated with the plants or the sprouts to the social community, and user activity in the social community.

17. The system of claim 15, wherein the user computing device is configured to access a commerce portal associated with a plurality of sponsored offers, the plurality of sponsored offers including one or more of the following: additional parts associated with the jar, replacement parts associated with the jar, and additional seed packets including further seeds for use with the jar, the plurality of sponsored offers being provided to the user for purchase.

18. The system of claim 17, wherein the user computing device is configured to:
collect data associated with the user and the interactions of the user with the jar;
analyze the data using machine learning and artificial intelligence; and
based on the analysis, perform one or more of the following:
generate planting or sprouting recommendations for the user, further users, or user groups;
provide the user with the plurality of sponsored offers; and
provide the data and results of the analysis to third-parties, the third-parties advertising one or more products to the user through a graphical user interface associated with the user computing device.

19. The system of claim 15, wherein the user computing device is configured to access an educational content portal, the educational content portal providing industry news, information concerning industry events, sprouting-specific content, and planting-specific content to the user.

20. A method for providing plant incubation, the method comprising:
providing:
a jar having a top opening and a bottom opening;
a seal lid configured to be removably secured at the top opening or the bottom opening;
a first perforated lid configured to be removably secured at the top opening or the bottom opening;
a second perforated lid configured to be removably secured at the bottom opening in replacement of the seal lid; and
a stand for supporting the jar vertically;
receiving, by a user computing device, data associated with the jar and data associated with seeds;
generating, by the user computing device and based on the data associated with the jar and the data associated with the seeds, reminders concerning planting the seeds and times for the reminders, the reminders including instructions to perform actions with respect to the jar, the seal lid, the first perforated lid, the second perforated lid, the stand, and the seeds, the actions including at least replacing the seal lid with the second perforated lid at the bottom opening; and providing, by the user computing device, the reminders to a user at the times for the reminders.

21. The method of claim 20, further comprising:

receiving, by the user computing device, a digital data from a smart unit integrated into the jar, the digital data being indicative of physical conditions associated with the jar; and providing, by the user computing device and based on the digital data, an alert or a message concerning the physical condition of the jar.

22. The method of claim 20, further comprising providing, by the user computing device and based on the data associated with the seeds, instructions concerning planting of the seeds, the instructions being presented by one or more of text messages, animation, videos, and augmented reality content.

23. The method of claim 20, further comprising:

determining, by the user computing device and based on the data associated with the seeds, an expected time for plants to be grown and an expected volume of the plants within the jar; and displaying, by the user computing device, an image of the jar and the expected volume of the plants within the jar.

24. The method of claim 20, wherein the jar has a top opening and a bottom opening and the reminders include one or more of the following:

an instruction to secure the seal lid at the bottom opening of the jar;

an instruction to fill the jar with the seeds and an amount of water, wherein the amount of water being determined based on the data associated with the jar and the data associated with the seeds;

an instruction to soak the seeds for a first period of time, the first period of the time being determined based on the data associated with the seeds;

an instruction to secure the first perforated lid at the top opening of the jar and invert the jar by the top opening down after the first period of time has expired;

an instruction to replace the seal lid at the bottom opening of the jar with the second perforated lid to allow air flow through the jar; and an instruction to invert the jar and rinse the jar and the seeds with water after a second period of time, the second period of time being determined based on the data associated with the seeds.

25. A system for providing plant incubation, the system comprising:

a jar having a top opening and a bottom opening;

a seal lid configured to be removably secured at the bottom opening;

a first perforated lid configured to be removably secured at the top opening;

a second perforated lid configured to be removably secured at the bottom opening in replacement of the seal lid;

a stand for supporting the jar vertically; and a smart unit integrated into the jar, the smart unit comprising:

at least one sensor configured to provide sensor data concerning physical conditions associated with the jar;

a logic controller configured to convert the sensor data in a digital data; and a wireless communication unit configured to transmit the digital data to a user computing device; and wherein the user computing device is configured to:

receive an information including data associated with jar, data associated with seeds, and the digital data;

generate, based on the information, reminders concerning planting the seeds and times for the reminders, the reminders including instructions to perform actions with the jar, the seal lid, the first perforated lid, the second perforated lid, the stand, and the seeds, the actions including at least replacing the seal lid with the second perforated lid at the bottom opening;

provide the reminders to a user at the times for the reminders; and provide, based on the digital data, an alert or a message concerning the physical condition of the jar.

* * * * *